United States Patent
Srinivasan et al.

(10) Patent No.: US 11,092,019 B2
(45) Date of Patent: Aug. 17, 2021

(54) COATED COMPONENT AND METHOD OF PREPARING A COATED COMPONENT

(71) Applicant: GENERAL ELECTRIC COMPANY, Schenectady, NY (US)

(72) Inventors: Dheepa Srinivasan, Karnataka (IN); Kishore Kancharala, Dammam (SA); Raghupatruni Prasad, Karnataka (IN); Sujith S, Karnataka (IN); Suresha SJ, Karnataka (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 254 days.

(21) Appl. No.: 16/158,297

(22) Filed: Oct. 12, 2018

(65) Prior Publication Data
US 2020/0116033 A1   Apr. 16, 2020

(51) Int. Cl.
*B32B 15/01* (2006.01)
*F01D 5/28* (2006.01)

(52) U.S. Cl.
CPC ............ *F01D 5/288* (2013.01); *B32B 15/017* (2013.01); *F05D 2230/90* (2013.01); *F05D 2260/95* (2013.01); *F05D 2300/171* (2013.01); *F05D 2300/177* (2013.01); *F05D 2300/611* (2013.01); *F05D 2300/701* (2013.01); *Y10T 428/12764* (2015.01)

(58) Field of Classification Search
None
See application file for complete search history.

(56) References Cited

U.S. PATENT DOCUMENTS 4,933,239 A * 6/1990 Olson ................ C23C 10/02
428/557
2004/0048090 A1 3/2004 Creech et al.

FOREIGN PATENT DOCUMENTS

| EP | 1 840 238 A2 | 10/2007 |
| EP | 2 743 369 A1 | 6/2014 |
| GB | 2 322 382 A | 8/1998 |
| WO | 01/94664 A2 | 12/2001 |
| WO | WO0194664 * | 8/2002 |

OTHER PUBLICATIONS

Extended European Search Report and Opinion issued in connection with corresponding EP Application No. 18198444.4 dated Dec. 11, 2018.

* cited by examiner

*Primary Examiner* — Daniel J. Schleis
(74) *Attorney, Agent, or Firm* — McNees Wallace & Nurick LLC

(57) ABSTRACT

A coated component and a method of preparing a coated component are provided. The method comprises providing a substrate; and applying a dual coating system to the substrate. The applying of the dual coating system includes applying a diffusion barrier coating; and applying a corrosion-resistant coating. The corrosion-resistant coating comprises a greater concentration of silicon and aluminum than the diffusion barrier coating, and the dual layer coating system includes an aluminide interdiffusion zone.

20 Claims, 2 Drawing Sheets

COATED COMPONENT AND METHOD OF PREPARING A COATED COMPONENT

CROSS REFERENCE TO RELATED APPLICATIONS

This application relates to and claims the benefit of India Patent Application No. 201741036271, filed Oct. 12, 2017, entitled "Coated Component and Method of Preparing a Coated Component."

FIELD OF THE INVENTION

The present disclosure is generally directed to a coated component and a method of preparing a coated component. More specifically, the present disclosure is generally directed to a coated alloy component and a method of preparing a coated alloy component.

BACKGROUND OF THE INVENTION

Gas turbines for power generation systems must satisfy the highest demands with respect to reliability, power, efficiency, economy, and operating service life. Modern high-efficiency combustion turbines have firing temperatures that exceed about 2,300° F. (1,260° C.), and firing temperatures continue to increase as demand for more efficient engines continues. Many components that form the combustor and "hot gas path" turbine sections are directly exposed to aggressive hot combustion gases. The use of coatings on turbine components, such as combustors, combustion liners, combustion transition pieces, combustion hardware, blades (buckets), vanes (nozzles) and shrouds, is important in commercial gas turbine engines.

Traditional oxidation coatings made of MCrAlY as well as diffusion aluminides are susceptible to hot corrosion in combustion environments. In certain coating systems, in order to enable a better hot corrosion resistant coating, the coating chemistry is adjusted to include Si as an alloying element. However, the addition of Si results in a coating that is brittle. Furthermore, known coating systems that are hot corrosion resistant are not always oxidation resistant.

BRIEF SUMMARY OF THE INVENTION

In an exemplary embodiment, a coated component is provided. The coated component comprises a substrate and a dual layer coating system overlying the substrate. The dual layer coating system comprises a diffusion barrier coating and a corrosion-resistant coating. The corrosion-resistant coating comprises a greater concentration of silicon and aluminum than the diffusion barrier coating, and the dual layer coating system includes an aluminide interdiffusion zone.

In another exemplary embodiment, a method of preparing a coated component is provided. The method includes providing a substrate; and applying a dual coating system to the substrate. The applying of the dual coating system includes applying a diffusion barrier coating; and applying a corrosion-resistant coating. The corrosion-resistant coating comprises a greater concentration of silicon and aluminum than the diffusion barrier coating.

Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Provided are an exemplary coated component and a method of preparing a coated component. Embodiments of the present disclosure, in comparison to components and method not utilizing one or more features disclosed herein, enable the formation of a durable, gradient dual layer coating system resistant to hot corrosion as well as oxidation, thereby extending the service life of the coated component without affecting functionality. Without the dual layer coating system, the components are limited in their operating temperatures and have increased service and/or repair requirements.

All numbers expressing quantities of ingredients and/or reaction conditions are to be understood as being modified in all instances by the term "about", unless otherwise indicated.

All percentages and ratios are calculated by weight unless otherwise indicated. All percentages are calculated based on the total weight of a composition unless otherwise indicated. All component or composition levels are in reference to the active level of that component or composition, and are exclusive of impurities, for example, residual solvents or by-products, which may be present in commercially available sources.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

The term "at least one," as used herein, means one or more and thus includes individual components as well as mixtures/combinations.

The term "comprising" (and its grammatical variations), as used herein, is used in the inclusive sense of "having" or "including" and not in the exclusive sense of "consisting only of."

The term "essentially devoid of" means containing less than 2 percent by weight of, preferably less than 1 percent by weight of, more preferably less than 0.1 percent any weight of, more preferably less than 0.01 percent by weight of, and even more preferably free of.

Figure 1:
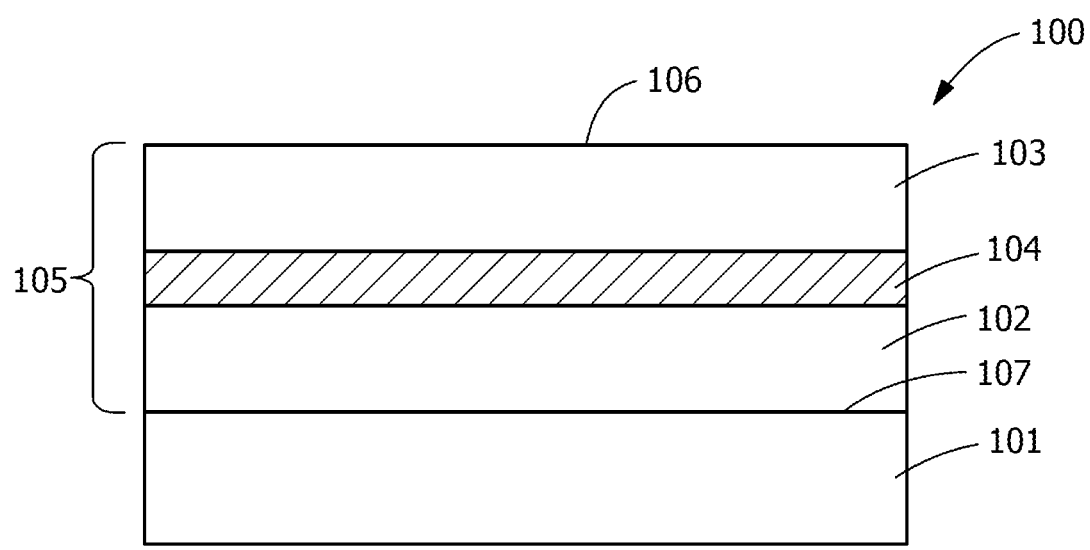
FIG. 1 illustrates a coated component, according to an embodiment of the present disclosure.

With reference to FIG. 1, a coated component 100 is provided. Coated component 100 comprises a substrate 101 and a dual layer coating system 105 overlying substrate 101. Dual layer coating system 105 comprises a diffusion barrier coating 102 and a corrosion-resistant coating 103. In the embodiment shown in FIG. 1, diffusion barrier coating 102 is adjacent substrate 101. Corrosion-resistant coating 103 comprises a greater concentration of silicon and aluminum than diffusion barrier coating 102, and dual layer coating system 105 includes an aluminide interdiffusion zone 104.

In one embodiment, substrate 101 comprises an alloy including, but not limited to, cobalt-based alloy, iron-based alloy, nickel-based alloy or combinations thereof in another embodiment, substrate 101 is cobalt-based alloy. In another embodiment, substrate 101 is essentially devoid of aluminum. In another embodiment, substrate 101 is devoid of aluminum. In another embodiment, substrate 101 is cobalt-based alloy devoid of aluminum.

In one embodiment, substrate 101 is formed from a CoCrMo alloy. In another embodiment, substrate 101 is formed from an alloy having a composition, by weight, of: about 10% nickel, about 29% chromium, about 7% tungsten, about 1% iron, about 0.25% carbon, about 0.01% boron, and balance cobalt (e.g., FSX414); about 3.5 to about 4.1% tungsten, about 9 to about 10% cobalt, about 13.7 to about 14.3% chromium, about 2.8 to about 3.2% aluminum, about 2.4 to about 3.1% of tantalum, about 4.7 to about 5.1% titanium, about 1.4 to about 1.7% molybdenum, about 0.35% of iron, about 0.005 to about 0.02% of boron, about 0.08 to about 0.12% of carbon and a balance of nickel (e.g., GTD 111); between about 22.2 and about 22.8% Cr, between about 18.5 and about 19.5% Co, about 2.3% Ti, between about 1.8 and about 2.2% W, about 1.2% Al, about 1.0% Ta, about 0.8% Nb, about 0.25% Si, between about 0.08 and about 0.12% C, about 0.10% Mn, about 0.05% Zr, about 0.008% B, incidental impurities, and a balance of Ni (e.g., GTD 222); about 22.5% Cr, about 19% Co, about 2% W, about 1.35% Nb, about 2.3% Ti, about 1.2% Al, about 0.1% C, incidental impurities, and a balance of Ni (e.g., GTD 241); between about 8% and about 10% molybdenum (Mo), between about 20.5% and about 23% chromium (Cr), between about 17% and about 20% iron (Fe), between about 0.2% and about 1% tungsten (W), between about 0.5% and about 2.5% cobalt (Co), between about 0.05% and about 0.15% carbon (C), up to about 1% silicon (Si), up to about 1% manganese (Mn), up to about 0.01% boron (B), up to about 0.04% phosphorus (P), up to about 0.03 sulfur (S), incidental impurities; and a balance of nickel (Ni) (e.g., HASTELLOY X); between about 19% and about 21% chromium (Cr), between about 19% and about 21% cobalt (Co), between about 5.6% and about 6.1% molybdenum (Mo), between about 1.9% and about 2.4% titanium (Ti), up to about 0.6% aluminum (Al), up to about 0.6% manganese (Mn), up to about 0.4% silicon (Si), up to about 0.2% copper (Cu), incidental impurities, and a balance of nickel (Ni) (e.g., Nimonic 263); about 0.015% boron, about 0.05% to about 0.15% carbon, about 20% to about 24% chromium, about 3% iron, about 0.02% to about 0.12% lanthanum, about 1.25% manganese, about 20% to about 24% nickel, about 0.2% to about 0.5% silicon, about 13% to about 15% tungsten, and balance cobalt (e.g., HAYNES® 188); about 22.5% to about 24.25% chromium, up to about 0.3% titanium (e.g., about 0.15% to about 0.3% titanium), about 6.5% to about 7.5% tungsten, about 9% to about 11% nickel, about 3% to about 4% tantalum, up to about 0.65% carbon (e.g., about 0.55% to about 0.65% carbon), about 2% to about 3% boron (e.g., about 2% to about 3% boron), about 1.3% iron, up to about 0.4% silicon, up to about 0.1% manganese, up to about 0.02% sulfur, and balance cobalt (e.g., MarM509); about 0.05% carbon, about 20% nickel, about 20% chromium, about 0.1% zirconium, about 7.5% tantalum, and balance cobalt (e.g., MarM918); about 5% iron, about 20% to about 23% chromium, up to about 0.5% silicon, about 8% to about 10% molybdenum, up to about 0.5% manganese, up to about 0.1% carbon, and balance nickel (e.g., IN625). In another embodiment, substrate 101 is formed from an alloy having a composition, by weight, of: about 7.5% cobalt, about 7.0% chromium, about 6.5% tantalum, about 6.2% aluminum, about 5.0% tungsten, about 3.0% rhenium, about 1.5% molybdenum, about 0.15% hafnium, and a balance of nickel (e.g., Rene N5); about 9.3% and about 9.7% W, between about 9.0% and about 9.5% Co, between about 8.0% and about 8.5% Cr, between about 5.4% and about 5.7% Al, up to about 0.25% Si, up to about 0.1% Mn, between about 0.06% and about 0.09% C, incidental impurities, and a balance of Ni (e.g., MarM247); about 9.3% and about 9.7% W, between about 9.0% and about 9.5% Co, between about 8.0% and about 8.5% Cr, between about 5.4% and 5.7% Al, tip to about 0.25% Si, up to about 0.1% Mn, between about 0.06% and about 0.09% C, incidental impurities, and a balance of Ni (e.g., MarM247LC); about 15.7% and about 16.3% Cr, about 8.0% to about 9.0% Co, between about 3.2% and about 3.7% Ti, between about 3.2% and about 3.7% Al, between about 2.4% and about 2.8% W, between about 1.5% and about 2.0% Ta, between about 1.5% and about 2.0% Mo, between about 0.6% and about 1.1% Nb, up to about 0.5% Fe, up to about 0.3% Si, up to about 0.2% Mn, between about 0.15% and about 0.20% C, between about 0.05% and about 0.15% Zr, up to about 0.015% S, between about 0.005% and about 0.015% B, incidental impurities, and a balance of Ni IN738); about 15.7% and about 16.3% Cr, about 8.0% to about 9.0% Co, between about 3.2% and about 3.7% Ti, between about 3.2% and about 3.7% Al, between about 2:4% and about 2.8% W, between about 1.5% and about 2.0% Ta, between about 1.5% and about 2.0% Mo, between about 0.6% and about 1.1% Nb, up to about 0.5% Fe, up to about 0.3% Si, up to about 0.2% Mn, between about 0.10% and about 0.20% C, between about 0.5% and about 1.0% Zr, up to about 0.015% S, between about 0.005% and about 0.015% B, incidental impurities, and a balance of Ni (e.g., IN738LC). Particularly suitable substrates includes CoCrMo alloys that have been formed by direct metal laser melting (DMLM), alloys having a composition, by weight, of: about 10% nickel, about 29% chromium, about 7% tungsten, about 1% iron, about 0.25% carbon, about 0.01% boron, and balance cobalt (e.g., FSX414) that have been deposited by DMLM or direct metal laser sintering (DMLS) including γ-γ'cobalt alloys that contain Al. In one embodiment, the concentration of aluminum in the alloy is less than about 1.0 wt % or less than about 0.8 wt % or less than about 0.5 wt % or less than about 0.1 wt % or less than about 0.05 wt % or less than about 0.01 wt %. In one embodiment, Rene N5 is substantially a single crystal. In one embodiment, Mar-M-247LC, IN738 and IN738LC are both equiaxed and directionally solidified (DS). In one embodiment, substrate 101 comprises the combination of aforementioned materials.

In one embodiment, diffusion barrier coating 102 includes MCrAlY (M=Ni, Co, Fe or combinations thereof), gel aluminide or combinations thereof. In another embodiment, the diffusion barrier coating is devoid of silicon. In one embodiment, diffusion barrier coating 102 is more ductile and oxidation-protective than corrosion-resistant coating 103.

In one embodiment, corrosion-resistant coating 103 is an aluminum and/or silicon rich corrosion-resistant coating. The corrosion-resistant coating comprises a greater concentration of silicon and aluminum than the diffusion barrier coating.

In one embodiment, corrosion-resistant coating 103 comprises 15 to 50% of aluminum and 2 to 15% of silicon based on the total weight of the corrosion-resistant coating.

Dual layer coating system 105 comprises a concentration gradient in silicon and aluminum increasing from a boundary 107 between substrate 101 and diffusion barrier coating 102 to an outer surface 106 of corrosion-resistant coating 103.

In one embodiment, coated component 100 is a hot gas path component. In another embodiment, coated component 100 is a turbine component including, but not limited to, blades (buckets), vanes (nozzles), shrouds, combustors, transition ducts, compressor blades, or combinations thereof. In another embodiment, coated component 100 is a gas turbine component.

Figure 2:
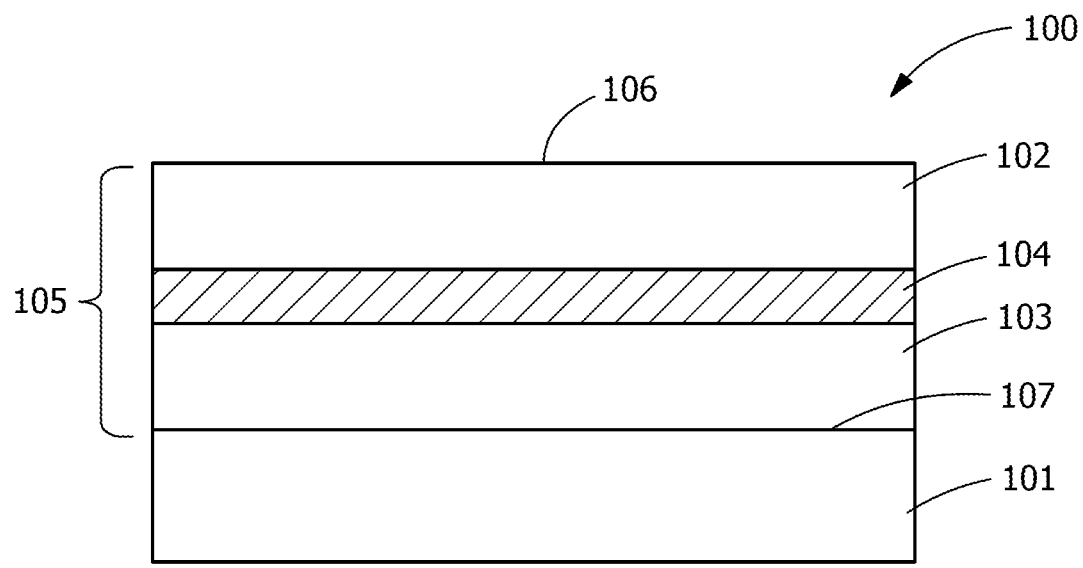
FIG. 2 illustrates a coated component, according to an embodiment of the present disclosure.

With reference to FIG. 2, a coated component 100 is provided. Coated component 100 comprises a substrate 101 and a dual layer coating system 105 overlying substrate 101. Dual layer coating system 105 comprises a diffusion barrier coating 102 and a corrosion-resistant coating 103. In the embodiment shown in FIG. 2, corrosion-resistant coating 103 is adjacent substrate 101. Corrosion-resistant coating 103 comprises a greater concentration of silicon and aluminum than diffusion barrier coating 102, and dual layer coating system 105 includes an aluminide interdiffusion zone 104. In one embodiment, dual layer coating system 105 comprises a concentration gradient in silicon and aluminum decreasing from a boundary 107 between substrate 101 and corrosion-resistant coating 103 to an outer surface 106 of diffusion barrier coating 102.

Figure 3:
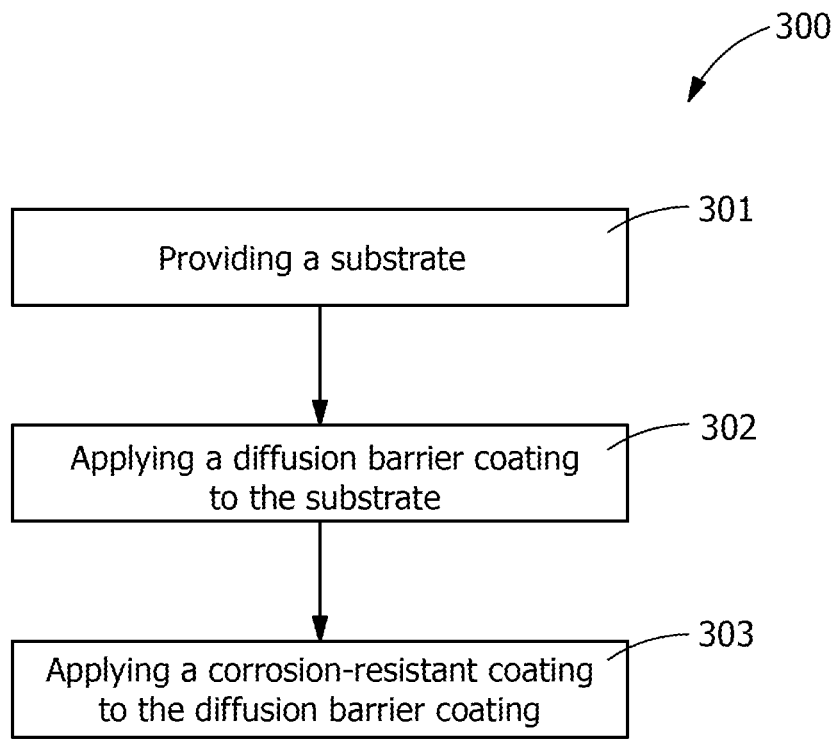
FIG. 3 is a flow chart illustrating a method of welding a treated component, according to an embodiment of the present disclosure.

With reference to FIG. 3, a method 300 of preparing a coated component is provided. The method 300 comprises providing a substrate (step 301). The method further includes applying a diffusion barrier coating 102 to the substrate 101 (step 302)

In some embodiments, the diffusion barrier coating 102 applied to the substrate 101 or the corrosion-resistant coating 103 is a MCrAlY bond coating alloy, where M is nickel, cobalt, iron, alloys thereof, or combinations thereof.

In some embodiments, the diffusion barrier coating 102 is applied by one or more thermal spraying techniques. In some embodiments, the thermal spraying technique is high-velocity oxygen fuel (HVOF) spraying, vacuum plasma spraying (WS), high-velocity air-fuel (HVAF) spraying, wire arc spraying, flame/combustion spraying, or any combinations thereof. The thermal spraying technique preferably heats the overlay material to a temperature of at least 1900° C. (3450° F.), alternatively to at least 2000° C. (3650° F.). In some embodiments, the HVOF spraying technique heats the overlay material to the range of about 2750° C. to about 3600° C. (5000-6500° F.), alternatively about 2750° C. to about 3300° C. (5000-6000° F.), alternatively about 2750° C. to about 3050° C. (5000-5500° F.), alternatively about 3050° C. to about 3300° C. (5500-6000° F.), alternatively about 3300° C. to about 3600° C. (6000-6500° F.), or any suitable combination, sub-combination, range, or sub-range thereof. In some embodiments, the HVAF spraying technique heats the overlay material to the range of about 1900° C. to about 2000° C. (3450-3550° F.), alternatively about 1900° C. to about 1950° C. (3450-3550° F.), alternatively about 1950° C. to about 2000° C. (3550-3650° F.), or any suitable combination, sub-combination, range, or sub-range thereof.

In some embodiments, the diffusion barrier coating 102 is an aluminide. In such embodiments, the diffusion barrier coating may be a slurry, a gel, or any other suitable material capable of application to the substrate 101 or the corrosion-resistant coating 103, such as vapor phase deposition. The aluminide in the diffusion barrier coating is preferably NiAl or $Ni_2Al_3$. In some embodiments, the diffusion barrier coating includes aluminum at a concentration, by weight, of about 8% to about 35%, alternatively about 12% to about 32%, alternatively about 15% to about 25%, alternatively about 15% to about 20%, alternatively about 20% to about 25%, alternatively about 20% to about 30%, alternatively about 25% to about 30%, alternatively about 15%, alternatively about 20%, alternatively about 25%, alternatively about 30%, or any suitable combination, sub-combination, range, or sub-range thereof.

The diffusion barrier coating 102 may be soaked or dipped in the slurry, gel, or other suitable material. Alternatively, the diffusion barrier coating forming material may be poured, sprayed, or brushed onto the substrate 101, and/or applied by any other application process capable of applying the diffusion barrier coating forming material. In some embodiments, the diffusion barrier coating 102 diffuses into the substrate 101, for example, by a diffusion depth. The diffusion depth may be at least about 25 microns (I mil), alternatively at least about 38 microns (1.5 mils), alternatively at least about 50 microns (2 mils), alternatively about 25 microns (1 mil), alternatively about 38 microns (1.5 mils), alternatively about 50 microns (2 mils), alternatively within a range of about 25 microns (1 mil) to about 50 microns (2 mils), alternatively within a range of about 25 microns (1 mil) to about 38 microns (1.5 mils), alternatively within a range of about 38 microns (1.5 mils) to about 50 microns (2 mils), or any suitable combination, sub-combination, range, or sub-range thereof.

In some embodiments, the applying of the diffusion barrier coating 102 is followed by or done while heating the diffusion barrier coating 102 and/or the component 100. For example, in one embodiment, the substrate 101 is positioned in an atmospheric furnace and the heating is performed, for example, in an inert atmosphere, such as with argon gas and/or with low oxygen content. In some embodiments, the heating is performed under a reduced pressure or a vacuum.

With reference to FIG. 3, the method further includes applying a corrosion-resistant coating 103 to the diffusion barrier coating (step 303). The corrosion-resistant coating comprises a greater concentration of silicon and aluminum than the diffusion barrier coating.

In some embodiments, the corrosion-resistant coating 103 is formed from application of a slurry including a donor powder, a binder, and a carrier, the donor powder including a metallic aluminum alloy. In one embodiment, the donor material includes aluminum and silicon. In one embodiment, the donor material includes at least 35 wt % aluminum or at least about 40 wt % or from about 40 wt % to about 4.5 wt % aluminum or from about 42 wt % to about 44 wt % aluminum or up to about 50 wt % aluminum. Suitable donor materials include, but are not limited to, aluminum alloys, aluminum containing compounds and other aluminum donor materials. The donor material may include additive components. Suitable additive components for the donor material may include, but are not limited to, powder in elemental form selected from at least one of the group consisting of silicon, chromium, titanium, tantalum or boron.

The binder is a heat curable binder and may include any suitable binder material, such as inorganic salts. In one embodiment, the binder material includes at least 10 wt % inorganic salt or at least about 20 wt % or from about 10 wt % to about 50 wt % inorganic salt or from about 15 wt % to about 30 wt % inorganic salt or from about 20 wt % to about 25 wt % inorganic salt. Suitable binder materials include, but are not limited to, chromate compounds, phosphate compounds, molybdate compounds, tungstate compounds, and combinations thereof. Examples of binder components include phosphoric acid, chromic acid, and combinations thereof.

The carrier may include inorganic or organic carriers. Suitable carriers include, but are not limited to, water, toluene, acetone, and combinations thereof. In one embodiment, the carrier is free of gel material. In one embodiment, the slurry is free of inert fillers and inorganic carriers. The absence of inert fillers and inorganic carriers prevents such materials from sintering and becoming entrapped in the substrate 102.

Suitable slurry compositions for use with the present disclosure include a composition comprising less than about 20 wt % phosphoric acid, less than about 1 wt % chromic acid, less than or equal to 50 wt % aluminum powder and less than about 6 wt % silicon powder, and a balance water as carrier. Another suitable slurry composition includes about 35% aluminum powder, about 6% silicon powder, about 12% phosphate-chromate binder (hinder salts), with a balance water as carrier.

The slurry is applied to the substrate 101 and heated to dry and cure the slurry on the diffusion barrier coating 101 and to leave a dried coating material. In one embodiment, the slurry includes, by weight, about 35 to about 65% of the donor powder, about 1 to about 25% of the binder, and balance essentially carrier. The applied slurry composition may include a non-uniform thickness with a minimum thickness of about 0.05 mm and a maximum thickness of about 1 mm or more, and the aluminide coating system 100 has a thickness which varies by about 0.01 mm or less, and is therefore essentially independent of the thickness of the slurry coating. The slurry coating may include a maximum thickness of about 1 mm. The slurry is applied to the surface of the substrate by any suitable technique. Suitable application techniques include spraying, rolling, dipping or brushing.

The drying step is preferably accomplished by heating the coating slurry to a drying temperature of from about 125° F. to about 300° F. (about 52° C. to about 149° C.) in air, for a time of from about 1 to about 4 hours. In addition, the coating is cured prior to diffusion treatment into a green-body by heating to a temperature from about 572° F. to about 752° F. (about 300° C. to about 400° C.) for a time of from about 1 to about 4 hours. In one embodiment, the applying, drying steps and curing steps may be repeated two times, three times, four times or more to provide a thicker dried coating.

The slurry coating that has been applied to the diffusion barrier coating 102, which may have been dried or not, is heated to form the dual coating system 105. The coating chamber is evacuated, and may be backfilled with an inert or reducing atmosphere (such as argon or hydrogen, respectively). The slurry may be heated on the substrate to a temperature within a range of about 800° C. to about 900° C. or 825° C. to about 875° C. or 840° C. to about 860° C. The temperature within the coating chamber is raised to a temperature sufficient to volatilize the slurry components, and aluminum is deposited on and into the substrate 102. The component 100 may be maintained at the diffusion temperature, for example, for a suitable duration, depending on the final thickness desired for the diffusion barrier coating 102 and the interdiffusion zone 104. The heat treatment may include any suitable duration, including, but not limited to, a duration from about 1 to 8 hours, alternatively from about 2 hours to about 7 hours, alternatively from about 3 hours to about 6 hours, or alternatively from about 4 to about 5 hours or alternatively from about 1 to about 3 hours or alternatively from about 1.5 to about 2.5 hours. The heat treatment of the slurry may form a residue. The residue may be removed by any suitable technique, including, but not limited to, directing forced gas flow at the aluminide coating system 100, grit blasting the aluminide coating system 100, or a combination thereof.

In one embodiment, the substrate 101 comprises an alloy including, but not limited to, cobalt-based alloy, iron-based alloy, nickel-based alloy or combinations thereof. In another embodiment, substrate 101 is cobalt-based alloy. In another embodiment, substrate 101 is essentially devoid of aluminum. In another embodiment, substrate 101 is devoid of aluminum. In one embodiment, substrate 101 is of FSX414, GTD 111, GTD 222, GTD 241, HASTELLOY X, Nimonic 263, HAYNES® 188, MarM509, MarM918, IN625, Rene N5, IN738, IN738LC, MarM247, MarM247LC or combinations thereof.

In one embodiment, the diffusion barrier coating 102 includes MCrAlY, gel aluminide or combinations thereof. In another embodiment, the diffusion barrier coating 102 is essentially devoid of silicon. In another embodiment, the diffusion barrier coating 102 is devoid of silicon. In one embodiment, diffusion barrier coating 102 is more ductile and oxidation-protective than corrosion-resistant coating 103.

In one embodiment, the step of applying a diffusion barrier coating to the substrate (step 302) comprises slurry, gel aluminide, any suitable diffusion aluminide, diffusion, EBPVD, plasma jet, air jet, air plasma jet, or combinations thereof.

With reference to FIG. 3, the dual layer coating system 105 comprises a concentration gradient in silicon and aluminum increasing from a boundary 107 between the substrate 101 and the diffusion barrier coating 102 to an outer surface 106 of the corrosion-resistant coating 103.

In one embodiment, method 300 further comprises a step of heating-treating the component to form an interdiffusion zone between the diffusion barrier coating and the corrosion-resistant coating. The heat treatment optimization creates more dispersed and continuous aluminide interdiffusion zone (IDZ).

In one embodiment, the method 300 further comprises a step of post-heat treating the component. The post-heat treating may include, for example, heating with a furnace to bring up the temperature of the gas turbine component. The post-heat treatment preferably alters the material of the dual coating system 105 and/or substrate 101 to allow the material from the diffusion zone to flow between the coating layers and between the coating layers and substrate 101 and to further bond the dual layer system 105 to the substrate 101.

A suitable post-heat treatment includes suitable temperatures, for example, temperatures of about 870° C. to about 1200° C. (1600° F. to 2200° F.), alternatively about 1040° C. to about 1180° C. (1900° F. to 2150° F.), alternatively about 1070° C. to about 1150° C. (1950° F. to 2100° F.), alternatively at about 1080° C. (1975° F.), alternatively at about 1090° C. (2000° F.), alternatively at about 1120° C. (2050° F.), or any suitable combination, sub-combination, range, or sub-range thereof. In one embodiment, heat treating is at a temperature capable of forming a ductile intermetallic material, such as a ductile aluminide, for example, having a strain range of about 4% and/or permitting the component 100 to be devoid or substantially devoid of cracking formed by application of a brittle aluminide.

In one embodiment, the coated component is a hot gas path component. In another embodiment, the coated component is a turbine component including, but not limited to, blades (buckets), vanes (nozzles), shrouds, combustors, transition ducts, or combinations thereof. In another embodiment, the coated component is a gas turbine component.

Figure 4:
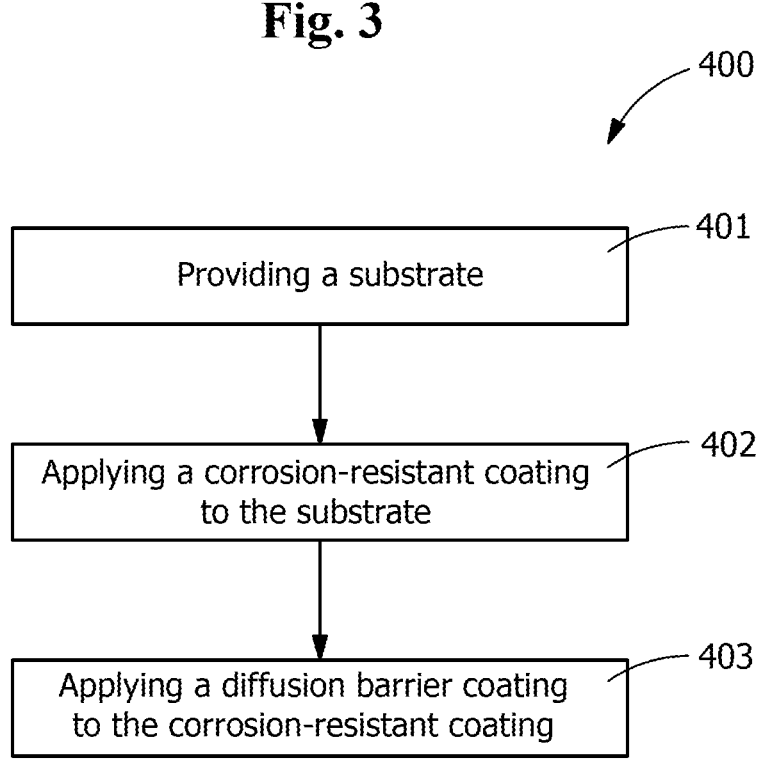
FIG. 4 is a flow chart illustrating a method of welding a treated component, according to an embodiment of the present disclosure.

With reference to FIG. 4, a method 400 of preparing a coated component is provided. The method 400 comprises providing a substrate (step 401). The method further includes applying a corrosion-resistant coating 103 to the substrate 101 (step 402). The method further includes applying a diffusion barrier coating 102 to the corrosion-resistant coating 103 (step 403). Each step can be implemented by the aforementioned corresponding methods described above with respect to FIG. 3.

In one embodiment, the dual layer coating system 105 comprises a concentration gradient in silicon and aluminum increasing from a boundary 107 between the substrate 101 and the corrosion-resistant coating 103 to an outer surface 106 of the diffusion barrier coating 102.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A coated component comprising:
   a substrate; and
   a dual layer coating system overlying the substrate, comprising:
      a diffusion barrier coating;
      a corrosion-resistant coating; and
      an aluminide interdiffusion zone disposed between the diffusion barrier coating and the corrosion-resistant coating,
   wherein the corrosion-resistant coating comprises greater concentrations of silicon and aluminum than the diffusion barrier coating.

2. The coated component of claim 1, wherein the substrate comprises an alloy selected from the group consisting of cobalt-based alloys, nickel-based alloys and combinations thereof.

3. The coated component of claim 1, wherein the substrate is devoid of aluminum.

4. The coated component of claim 1, wherein the corrosion-resistant coating includes a sufficient amount of silicon and aluminum to form the aluminide interdiffusion zone.

5. The coated component of claim 1, wherein the diffusion barrier coating is an MCrAlY.

6. The coated component of claim 1, wherein the diffusion barrier coating is devoid of silicon.

7. The coated component of claim 1, wherein the diffusion barrier coating is adjacent to the substrate.

8. The coated component of claim 1, wherein the dual layer coating system comprises a concentration gradient in silicon and aluminum decreasing from a boundary between the substrate and the corrosion-resistant coating to an outer surface of the diffusion barrier coating.

9. The coated component of claim 1, wherein the dual layer coating system comprises a concentration gradient in silicon and aluminum increasing from a boundary between the substrate and the diffusion barrier coating to an outer surface of the corrosion-resistant coating.

10. The coated component of claim 1, wherein the corrosion-resistant coating is disposed between the substrate and the diffusion barrier coating.

11. The coated component of claim 1, wherein the diffusion barrier coating is disposed between the substrate and the corrosion-resistant coating.

12. The coated component of claim 1, wherein the coated component is a turbine component selected from the group consisting of buckets, nozzles, shrouds, combustors, transition ducts, compressor ducts, and combinations thereof.

13. The coated component of claim 1, wherein the corrosion-resistant coating comprises 15-50% aluminum and 2-15% silicon, based on the total weight of the corrosion-resistant coating.

14. The coated component of claim 1, wherein the corrosion-resistant coating is adjacent to the substrate.

15. The coated component of claim 1, wherein the diffusion barrier coating is gel aluminide.

16. The coated component of claim 1, wherein the corrosion-resistant coating is an MCrAlY.

17. The coated component of claim 1, wherein the diffusion barrier coating comprises, by weight, 8-35% aluminum.

18. A coated component comprising:
   a substrate comprising an alloy selected from the group consisting of cobalt-based alloys, nickel-based alloys, and combinations thereof; and
   a dual layer coating system overlying the substrate, comprising:
      a diffusion barrier coating;
      a corrosion-resistant coating; and
      an aluminide interdiffusion zone disposed between the diffusion barrier coating and the corrosion-resistant coating,
   wherein the corrosion-resistant coating comprises greater concentrations of silicon and aluminum than the diffusion barrier coating, and
   wherein the dual layer coating system comprises a concentration gradient in silicon and aluminum decreasing from a boundary between the substrate and the corrosion-resistant coating to an outer surface of the diffusion barrier coating.

19. A method of preparing a coated component comprising:
   providing a substrate;
   applying a dual coating system to the substrate, the applying of the dual coating system comprising:
   applying a diffusion barrier coating;
   applying a corrosion-resistant coating; and forming an aluminide interdiffusion zone disposed between the diffusion barrier coating and the corrosion-resistant coating, wherein the corrosion-resistant coating comprises greater concentrations of silicon and aluminum than the diffusion barrier coating.

20. The method of claim 19, further comprising post-heat treating the component.

\* \* \* \* \*